March 24, 1959
L. L. GORDON
2,879,445
CATHODE RAY TUBE ENERGIZING CIRCUIT
Filed March 29, 1955
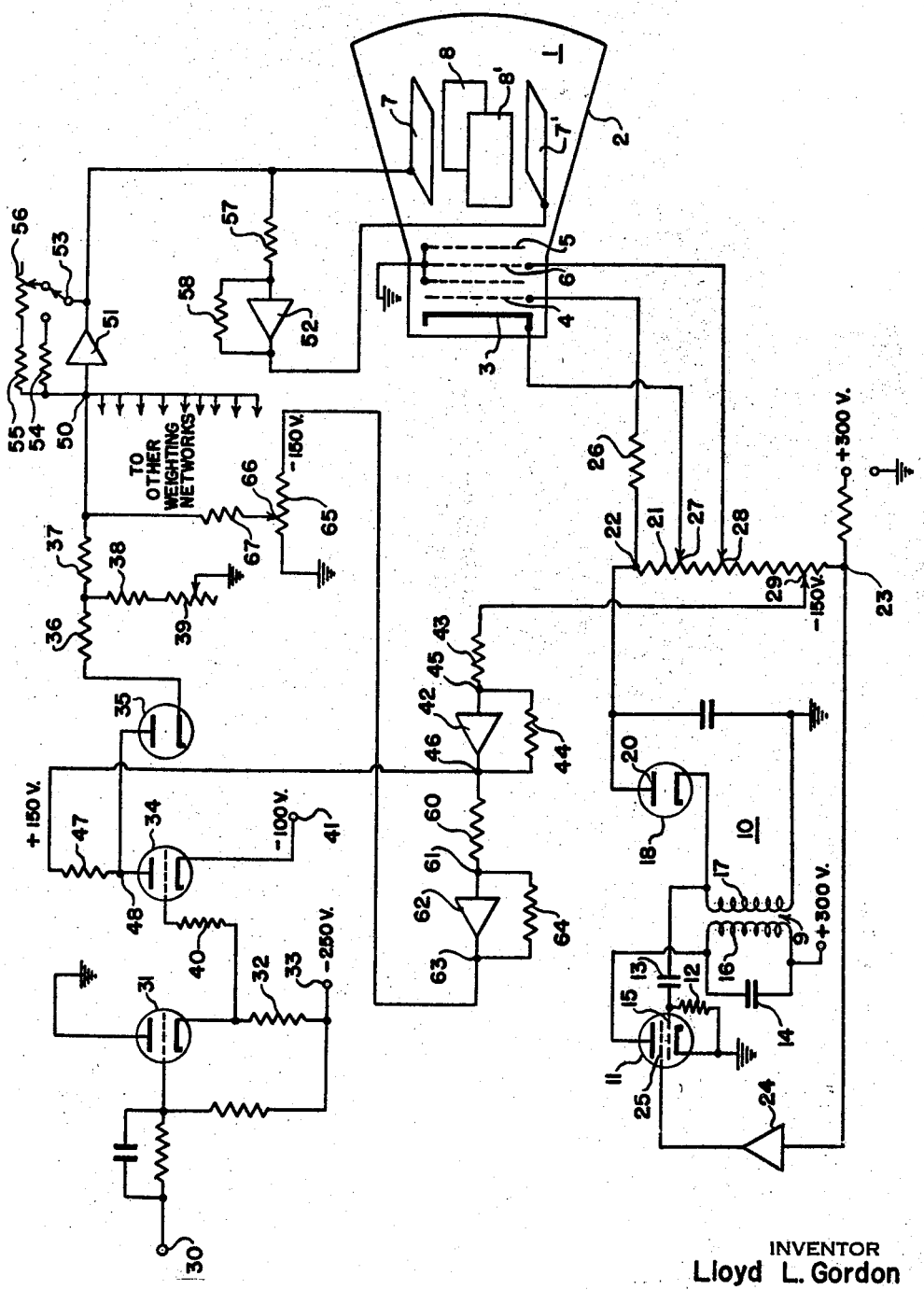
INVENTOR
Lloyd L. Gordon
BY
ATTORNEYS United States Patent Office 2,879,445
Patented Mar. 24, 1959

2,879,445

CATHODE RAY TUBE ENERGIZING CIRCUIT

Lloyd L. Gordon, Eau Gallie, Fla., assignor to Electronic Associates, Inc., Long Branch, N.J., a corporation of New Jersey Application March 29, 1955, Serial No. 497,489

15 Claims. (Cl. 315—15)

This invention relates to circuits for cathode ray tubes and more particularly to circuits for energizing the several electrodes of a cathode ray tube.

It is well known to those skilled in the art that the accuracy of the presentation of information on the screen of a cathode ray oscilloscope is governed in large measure by the limitations inherent in such tubes. In order for a high degree of accuracy in the presentation to be maintained the voltages supplied to the tube for energizing the various electrodes must be very accurate in relationship to one another. Inasmuch as it is practically impossible to maintain several different voltage sources at constant level for any appreciable time, an alternative attack on the problem must be resorted to. It is known that, in general, the strength of field, either electrostatic or magnetic, required to deflect the electron beam of a cathode ray tube is proportional in some degree to the strength of the accelerating field. That is to say, the velocity of the electrons in the beam as they proceed from the cathode to the fluorescent screen of the tube is determined by the strength of the accelerating field; therefore, to deflect a higher velocity electron beam by the same amount as a lower velocity beam requires a deflecting field of proportionally higher intensity. This is, in effect, a relation which determines the deflection sensitivity of the cathode ray tube. To achieve a high degree of accuracy in the presentation of information on the screen of the cathode ray tube, it then becomes necessary to maintain the sensitivity of the tube as nearly constant as is possible. It is to be noted that this does not require that the energizing voltages of the several electrodes be held at constant values, but only that the relation between the energizing voltages for the several electrodes be maintained proportional to each other in the highest degree possible. Then, even though the absolute value of an energizing voltage for one electrode does vary, the accuracy of the presentation of information on the fluorescent screen is not affected. This follows since the sensitivity of the tube does not vary so long as the voltages of the several electrodes remain proportional, within determinable limits.

While the theoretical basis for the foregoing remarks has been known, practical means for the realization of high degrees of accuracy required in many present day applications have not, prior to my invention, been found. The consequence of this has been, therefore, that means other than cathode ray tubes have, of necessity, been employed even though the manner in which they present information lacks many of the desirable characteristics to be had only with cathode ray tubes.

I have invented a cathode ray tube energizing circuit for supplying energizing voltages to the several electrodes of the tube in such a way that variations in the energizing potential of one electrode are proportionally matched by variations in the energizing voltages of the other electrodes of the tube to achieve the beneficial result that the sensitivity of the tube and the desired effects of the various control electrodes are maintained constant to a degree of accuracy not heretofore obtained in circuitry of this kind. According to my invention a cathode ray tube having a thermionic cathode, and control, focusing, accelerating and deflecting electrodes is supplied with energizing voltages for the cathode and the several electrodes from a single source of voltage, the voltage of the source being great enough to supply the maximum voltage required by any electrode of the tube. The voltages required by the remaining electrodes of the tube are derived from a voltage dividing means cooperating with the source. The signal carrying the information which is ultimately to be presented on the screen of the cathode ray tube is introduced into circuitry which is also energized from the voltage dividing means. Certain of the energizing and control voltages for the cathode ray tube and its attendant circuitry must be relatively negative or positive with respect to other voltages. In accordance with my invention I utilize high gain direct current amplifiers to effect the inversion of voltages derived from the voltage dividing means while maintaining a high degree of accuracy in the course of the inversion.

The circuitry employed for introducing the signal to be displayed on the screen of the cathode ray tube is especially adapted for use in the overall energizing circuit. It comprises a gate circuit and a signal weighting circuit which are ultimately energized from the voltage dividing means as previously stated. The gate circuit utilizes thermionic devices which respond to the applied signal in such a way that the voltage developed in the signal weighting circuit to be applied to the deflecting electrodes of the cathode ray tube has a magnitude which is accurately related to the energizing voltage supplied from the voltage dividing means. Thus, the absolute magnitude and any variations therein of the signal voltage are determined by the magnitude and variations of the energizing voltages supplied from the voltage dividing means.

Particular details and features of my invention are fully set forth in the following description of one embodiment of my invention in which reference is made to the accompanying drawing. This drawing is a schematic representation of a cathode ray tube energizing circuit.

In the drawing there is generally indicated at 1 a cathode ray tube which, in this particular embodiment, is of the monoaccelerator type. This tube is provided with an evacuated envelope 2 containing a thermionic cathode 3, a control electrode or grid 4, an accelerating anode 5, a focusing electrode 6 and four deflecting electrodes which are cooperatively arranged in opposed pairs 7, 7' and 8, 8', respectively, the pair bearing the numerals 7, 7' being in space quadrature with the pair bearing the numerals 8, 8'. The function of each of these electrodes is fully understood in the art and further description thereof need not be given except as it is incidentally appropriate to a description of the operation of the overall circuit according to the invention.

As generally indicated at 10, I provide a regulated source of voltage which need not be of any particular type. However, for purposes of illustation I have shown a particular type of power supply which comprises the tetrode vacuum tube 11 arranged to operate as a source of high frequency oscillations. The particular means I employ includes the tuned circuit in the plate circuit of the tube 11. The tuned circuit comprises the capacitance 14 and the inductive primary winding 16 of a step-up transformer 9. This oscillator circuit also includes a conventional coupling capacitance 13 for transferring oscillations in the secondary circuit 17 of the transformer 9 back to the grid 15 of the tube 11. The plate of oscillator tube 11 is energized from an external well regulated power supply not shown. As will subsequently appear, other elements of the overall circuit are also energized from an external power supply which may be the same as that just referred to. It will be understood that ground level for the entire apparatus is established by the ground return of this external power supply.

The alternating current induced in the secondary 17 of transformer 9 is rectified by diode 18 to supply a high D.C. voltage. This voltage is taken off the plate 20 of diode 18 and applied across a voltage dividing means 21 connected between terminal 22 and terminal 23, the latter of which is connected to a positive terminal of the aforementioned external power supply. The voltage dividing means may be a multiple tap potentiometer or a number of precision resistances of appropriate values connected in series. In either case the resistance element or elements of the dividing means must be very accurate and stable in order that the high accuracy obtainable with the circuit of my invention may be realized. The end of the dividing means indicated at terminal 22 is connected to the plate 20 of the rectifying diode 18 and is therefore the most negative point, e.g. —5000 volts with respect to ground level, on the voltage dividing means. At the other terminal 23 of the voltage dividing means which is the most positive point, e.g. approximately ground level, there is connected the input to a suitable amplifier indicated schematically at 24, the output of which is connected to the screen grid 25 of the oscillator tube 11. Any suitable type of amplifier may be used and it is sufficient to say that the amplifier 24 is of a type which is responsive to variations in voltage at the terminal 23 with respect to a relatively fixed voltage level such as ground, which shall be referred to in some of the claims as a predetermined reference voltage. This amplifier may be a high gain comparartor type, and serves to vary the voltage on the screen grid 25 of the tube 11 in such a way that variations in the supply voltage are accurately reflected by proportional changes in the output voltage of the oscillator-rectifier combination. The direct consequence of this is that the voltages at the taps of the voltage dividing means 21 will vary in direct proportion.

It is to be understood that the invention is not limited to any particular type of voltage source and that the circuit just described is merely an illustration of a suitable source of regulated voltage to be used in conjunction with the energizing circuit according to the invention.

The several electrodes of the cathode ray tube are energized in the following manner. A connection through resistance 26 is made from the terminal 22 on the voltage dividing means to the control electrode or grid 4 of the cathode ray tube. As previously stated the terminal 22 is the point of greatest negative voltage. At a tap 27 a connection is made to the cathode 3 of the cathode ray tube. It will be understood that this tap 27 may as well be the junction between two precision resistors depending upon which of the two previously described alternatives for the voltage dividing means is being utilized in the particular case. In either case, the voltage at the tap 27 is relatively more positive than the terminal 22. In the same manner a connection is made between the tap 28 on the voltage dividing means to the focusing electrode 6. This tap 28 is at a relatively more positive potential than that of the tap 27. The accelerating electrode or anode 5 of the cathode ray tube is connected to a point of reference potential which in this particular embodiment is ground level. Thus, the accelerating anode 5 is at a high positive potential with respect to the cathode 3 as is customary in cathode ray tubes.

It is now appropriate to point out that the embodiment of the invention being described is especially adapted to the presentation or display of information which is supplied from other apparatus in binary-digital form. As is well known, any digital value may be represented by appropriate combinations of individual numbers in a set such as 1, 2, 4, 8, 16, etc. Thus, 5 is represented by the individual numbers 1 and 4 of the set. In a similar manner, 19 may be represented by 1, 2, and 16. In general it can be said that a set of numbers of the kind under discussion can be used to represent any integer from 1 to 2N minus 1 where N is the value of the highest member of the set. Accordingly, if the first ten members of the series 1, 2, 4, 8, 16, and so on to 512 are utilized, any integer from 1 to 1023 may be represented by appropriate combinations of the members of the set.

In the embodiment of my invention being described I contemplate using the values of the series beginning with 1 and ending at 512 which comprises ten members of the set. Accordingly, it is necessary to have ten channels, one for each member of the set. It is not necessary to the description of my invention that the apparatus supplying the information be described. It is sufficient to say that there may be ten channels on each of which there may be a binary representation of the member of the set assigned to that channel. This is accomplished by the presence or absence of a voltage which indicates that the particular value on that channel is to be or not to be included in the presentation on the cathode ray tube. It should be borne in mind that it is merely the existence or absence of a voltage on a given channel which is utilized in this particular embodiment of my invention.

For simplicity I have shown only so much of the circuit according to my invention as is necessary to accommodate one of these binary-digital input channels. Suppose then that the channel representing the value 1 is connected to the terminal 30. The presence of a voltage representative of the value 1 is applied in such polarity as to bias the grid of cathode follower tube 31 in the direction of cut-off to decrease the conductivity of the tube. This has the result that the cathode potential of the tube 31 approaches the negative voltage supplied at the terminal 33 from an external source. On the other hand, in the absence of the voltage applied at the terminal 30, which corresponds to the absence of a 1 on the channel, the tube 31 becomes conductive and the cathode potential becomes relatively more positive than the voltage applied at the terminal 33.

The cathode potential of the tube 31 under the two aforementioned conditions is utilized to control the operation of a gate circuit and signal weighting network. The gate circuit comprises the triode 34 and the diode 35. The weighting network includes the resistances 36, 37, 38 and a variable resistance 39.

The output of the cathode follower 31 is connected through resistance 40 to the grid of the gate circuit triode 34. The cathode of the triode 34 is supplied at terminal 41 with a potential from an external source which is relatively more positive than the potential applied at the terminal 33 but less than ground potential. Plate voltage for the triode 34 is derived from a tap on the voltage dividing means from which other electrode voltages for the cathode ray tube are also derived. This is accomplished in the following manner to obtain a plate voltage which is held proportional to the electrode voltages for the cathode ray tube within a small fraction of a percent. The plate voltage is derived from a tap 29, e.g. at —150 volts, on the voltage dividing means 21. Inasmuch as all voltages taken from the voltage dividing means are relatively negative with respect to ground, it becomes necessary to change the polarity of the voltage at tap 29 before it can be applied to the plate of the tube 34.

I accomplish this by interposing between the tap 29 and the plate resistance 47 an inverting, high gain D.C. amplifier incorporating an automatic balancing circuit, represented schematically at 42, which I adapt to operate as an inverting unity gain amplifier to provide extremely close matching of the magnitude of the output voltage to the magnitude of the input voltage while changing the polarity of the latter. High gain D.C. amplifiers incorporating automatic balancing circuits are well known in the electronic computer art and their characteristics are fully described in Korn and Korn; (Electronic Analog Computers, published by McGraw-Hill Book Co., Inc. (1952), particularly at pp. 206–207. Amplifiers of this kind are also known as "chopper stabilized" amplifiers. Generally, it may be stated that their overall gain may be controlled by relating the value of the input resistance 43 to that of the feedback resistance 44 connected between the output 46 of the amplifier and its input 45. To obtain an overall gain of unity the input and feedback resistances are made equal. Briefly, the action of the amplifier is such that when a signal voltage of, say, negative polarity is applied to the input 45 the output voltage at 46 begins to rise positively which tends to counteract the effect of the applied input voltage. While the feedback can never completely overcome the input voltage, it does so to a very large extent, namely, the input voltage is reduced to the value of the output voltage divided by the amplification factor of the amplifier. In amplifiers of this kind the factor is usually extremely high and may be in excess of 200,000. Thus, the output voltage of amplifier 42 will be of opposite polarity to that of the input voltage and will have the same magnitude to within 0.01%.

The output of amplifier 42 is applied to the plate of the tube 34 through the load resistance 47. It will now be apparent to one skilled in the art that when the tube 34 is rendered conductive, as previously described, the plate potential at the terminal 48 will fall due to the voltage drop across the load resistance 47. In this particular embodiment the components in this portion of the circuit are so selected that when the tube 34 is conductive the voltage at the terminal 48 falls to a value below ground level. This is possible inasmuch as the cathode potential of this tube is made negative with respect to ground. On the other hand, when the tube is cut off due to a large negative bias being applied to its grid from the preceding cathode follower 31, the potential at the terminal 48 tends to rise to the plate voltage supplied from the unity gain D.C. amplifier 42. The changing voltage at the terminal 48 of the plate of the tube 34 is used to control the flow of current through the diode 35 and the weighting network comprising the resistances 36, 37, 38 and 39.

As shown in the drawing the diode 35 has its plate connected directly to the plate terminal 48 while the cathode of the diode is connected to ground through the weighting network resistances 36, 38 and 39 in series. The resistance 39 on the ground end of this string of resistances is preferably a variable resistance so that the total resistance between cathode and ground of the tube 35 may be precisely adjusted. Now, when the potential at the terminal 48 is below ground level, due to circumstances previously set out, the potential of the diode plate 35 is negative with respect to ground and the diode is non-conductive. Consequently, there is no voltage drop across any of the resistances 36, 38 and 39. This condition corresponds to the absence of a voltage in the computer channel connected to the terminal 30. On the other hand when the tube 34 is cut off due to the presence of a voltage representative of the value 1 on the computer channel connected to the terminal 30, the plate potential at the terminal 48 tends to rise to a positive value. Under this condition the plate potential of the diode 35 becomes positive and the diode begins to conduct. Current is drawn through the resistance 47 which prevents the voltage at the terminal 48 from rising to the full value of the voltage supplied from the output terminal 46 of the inverting amplifier 42. Of course, the current through the diode 35 is also controlled by the values of the resistances 36, 38 and 39. As all of these resistances are of the precision type, the current through them and hence the voltage drop across each of them may be very closely determined. It is in this weighting network that the signal representative of the value 1 to be applied to the cathode ray tube for presentation on the screen thereof is actually developed. The signal to be used has the magnitude of the voltage drop across one or more of the resistances of predetermined value in the weighting network. Here it is the voltage drop across the resistances 38 and 39 which is taken off at the junction between resistances 36 and 38 and applied through resistance 37 to a summing point 50 which is the input terminal of a deflecting amplifier.

This arrangement of the gate circuit comprising the triode 34 and the diode 35 supplied from a highly accurate source together with the weighting network of resistances is an important aspect of my invention. One of its principal features is that it permits the use of low values of resistances at 36, 37, 38 and 39, thus maintaining the band width at a relatively high level. Moreover, the gate circuit is unique in its simplicity and it has the advantage that the plate of the diode operates at a constant voltage when it is conducting and that the characteristics of the triode 35 and of the preceding circuitry are effectively eliminated during the time that the signal voltage ultimately to be applied to the cathode ray tube is being developed in the weighting network. All of these features contribute to the high accuracy obtainable with circuits according to this invention.

To this point I have described the circuitry required for developing an accurate signal representative of the value 1 to be applied to the cathode ray tube in response to the presence of a signal from the binary-digital input channel connected to the terminal 30. It is to be understood that there are nine other such gating circuits and weighting networks, one for each of the other nine computer channels carrying signals representative of the other nine values of the members of the set 1, 2, 4, 8, 16, etc. The only significant difference between the gating circuit and weighting network described in detail above and each of the nine other gating circuits and weighting networks lies in the values of the resistances corresponding to resistances 36, 38 and 39 in the other weighting networks. They will, of course, have different values to provide proportionately different voltage drops representative of the greater values to be represented.

Each of the other nine weighting networks is connected to the common summing point 50 through input resistances similar to resistance 37. The summing point 50 is the input terminal of deflection summing amplifier 51 having a fixed feedback resistance 54 and a variable feedback resistance comprising the resistance 55 and the variable resistance 56 in series. The fixed or the variable feedback may be connected between the output and input of amplifier 51 by means of switch 53 and the variable feedback is provided to afford precision adjustment of the overall gain of the amplifier where desirable. Amplifier 51 is a high gain D.C. amplifier substantially the same in all respects as amplifier 42 and it operates to produce at its output a voltage proportional to the sum of the voltages applied to its input.

The output voltage of the deflection amplifier 51 is applied to the deflecting electrodes 7, 7' to deflect the cathode ray beam from a central axis by an amount proportional to the voltage. As will be understood the voltage applied to electrode 7' must be of opposite polarity with respect to the voltage applied to electrode 7. To this end I interpose between the output of amplifier 51 and electrode 7' a second deflection amplifier 52 which is also a high gain D.C. amplifier like amplifier 42 and is adapted by means of input resistance 57 and feedback resistance 58 to operate as a unity gain, inverting amplifier. The voltages of equal magnitude and opposite polarity applied to the electrodes 7, 7' serve to deflect the electron beam of the tube 2 as it proceeds from the cathode 3 to the screen of the tube as is well known. It is to be emphasized that the magnitude of the voltages applied to the deflecting electrodes 7, 7' is ultimately determined by the plate voltage supplied to the diode 35 in the gate circuit and that these electrode voltages will always remain proportional to the other electrode voltages of the cathode ray tube inasmuch as they are all derived from the same source.

The pair of deflecting electrodes 8, 8' in space quadrature with the electrodes 7, 7' are used to deflect the electron beam in a direction perpendicular to the direction the beam is deflected by the pair 7, 7'. Customarily, a sweep voltage having any suitable wave form is applied to the electrodes 8, 8' to deflect the cathode ray beam across the screen at a linear or non-linear rate as is desired in the particular case. Inasmuch as such circuitry is well known in the art, it is believed that it is not necessary to describe a particular sweep generator in connection with this invention.

In some applications it may be desirable to apply to the electrodes 8, 8' deflecting signals having characteristics similar to those of the signals applied to the electrodes 7, 7'. In this case the circuitry including gate circuits and weighting networks are provided from appropriate computer or other signal channels to a second deflection summing amplifier corresponding to the amplifier 50 described above. The voltage from the second summing amplifier may be applied to deflecting electrodes 8, 8' in a manner corresponding to that previously described. It will be understood that to obtain the principal features of my invention with this circuitry for the deflecting electrodes 8, 8' the gating circuits therein will also be energized from the voltage dividing means 21 in substantially the same manner as previously described. It will often be found desirable that the additional voltages required be obtained directly from the output 46 of the inverting amplifier 42.

A centering control voltage is also provided in this embodiment of my invention, the purpose of which is to enable the display of information on the cathode ray tube screen to be adjustable with respect to a central axis of the screen. As this centering voltage may also affect the deflection sensitivity of the cathode ray tube, I derive it from the voltage dividing means in the same way that the other energizing potentials for the tube are obtained. Since the centering voltage is merely required to act as a constant bias to establish the undeflected position of the cathode ray beam, it can be conveniently applied to the summing point 50. I utilize the voltage available at the output terminal 46 of the inverting amplifier 42. This voltage is applied through an appropriate input resistance 60 to the input 61 of another unity gain, inverting amplifier 62 which is identical to amplifier 42 and operates in the same way to reinvert the voltage at the terminal 46 to produce at the output terminal 63 a voltage having the opposite polarity and the same amplitude within a fraction of a percent. Feedback for amplifier 62 is represented by the resistance 64 connected between the output terminal 63 and the input terminal 61. The voltage available at the terminal 63 is applied across a potentiometer 65 to ground and the centering voltage is taken off the variable tap 66 of potentiometer 65 and connected through a suitable resistance 67 to the summing point 50.

As in the case of the other energizing potentials for the cathode ray tube the magnitude of the centering voltage at any time will be determined by the voltage derived from the voltage dividing means. The important feature is that any variations in the supply voltage will be reflected proportionately in the centering voltage, thereby precluding any variations in the deflecting sensitivity of the cathode ray tube.

Having described only one embodiment of my invention to illustrate the principles and features thereof, it is apparent that many alternative embodiments are entirely feasible and practical. I do not propose to be limited to the details of the embodiment described above but only by the scope of the following claims.

I claim:

1. An energizing circuit for a cathode ray tube having at least a cathode electrode, a control electrode, a focusing electrode, an electron accelerating electrode and a pair of electron deflecting electrodes, which energizing circuit comprises a source of D.C. voltage, means for maintaining said accelerating electrode at a predetermined reference voltage, voltage dividing resistance means connected to said source and having a plurality of taps at different voltage levels, controlling means connected to a tap on said voltage dividing means which is at said predetermined reference voltage for detecting variations of the voltage of said source and for maintaining variations of the voltages derivable from said dividing means proportional to variations of the voltage of said source, connections between some of said taps and said cathode, control and focusing electrodes respectively for maintaining said last recited electrodes at negative voltages with respect to said reference voltage, and means for receiving signals and impressing the same on said pair of deflecting electrodes, which receiving and impressing means are regulably energized from a connection to a tap on said voltage dividing means.

2. An energizing circuit for a cathode ray tube having at least a cathode electrode, a control electrode, a focusing electrode, an electron accelerating electrode and a pair of electron deflecting electrodes, which energizing circuit comprises means for maintaining said accelerating electrode at a predetermined reference voltage, a source of regulated D.C. voltage, voltage dividing resistance means cooperating with said source and having a plurality of taps at different voltage levels, connections between some of said taps and said cathode, control and focusing electrodes respectively for maintaining said last recited electrodes at negative voltages with respect to said reference voltage, and means for receiving signals and impressing the same on said pair of deflecting electrodes, which receiving and impressing means are energized from a connection to a tap on said voltage dividing means, said last named connection including a voltage inverting amplifier.

3. An energizing circuit for a cathode ray tube having at least a cathode electrode, a control electrode, a focusing electrode, an electron accelerating electrode and a pair of electron deflecting electrodes, which energizing circuit comprises means for maintaining said accelerating electrode at a predetermined reference voltage, a source of regulated D.C. voltage, voltage dividing resistance means cooperating with said source and having a plurality of taps at different voltage levels, connections between some of said taps and said cathode, control and focusing electrodes respectively for maintaining said last recited electrodes at negative voltages with respect to said reference voltage, a gate circuit for signals to be applied to said deflecting electrodes comprising an electron discharge device having at least a cathode and an anode, an energizing connection between said anode and a tap on said resistance means, which last named connection includes a voltage inverting amplifier, an output impedance in the cathode circuit of said device, and means for impressing a voltage developed across said impedance on each of said deflection electrodes in opposite polarity respectively.

4. An energizing circuit for a cathode ray tube having at least a cathode electrode, a control electrode, a focusing electrode, an electron accelerating electrode and a pair of electron deflecting electrodes, which energizing circuit comprises means for maintaining said accelerating electrode at a predetermined reference voltage, a source of regulated D.C. voltage, voltage dividing resistance means cooperating with said source and having a plurality of taps at different voltage levels, connections between some of said taps and said cathode, control and focusing electrodes respectively for maintaining said last recited electrodes at negative voltages with respect to said reference voltage, a gate circuit for signals to be applied to said deflecting electrodes comprising a first electron discharge device having at least a cathode, an anode and a signal grid, an energizing connection between a tap on said resistance means and the anode of said first discharge device, said last named connection including a voltage inverting unity gain amplifier and a load resistance, a second electron discharge device having a cathode and an anode and a signal weighting resistance network connected in series between the anode of said first discharge device and a point of fixed potential, means for rendering said first discharge device non-conductive upon the application of a signal to the grid thereof, thereby causing said second discharge device to become conductive, and means for applying the voltage drop in said resistance network to each of said deflecting electrodes in opposite polarity respectively.

5. An energizing circuit according to claim 6 in which said means for applying a voltage comprises first and second voltage inverting deflection amplifiers having input and output terminals, said input terminal of said first deflection amplifier being connected to said resistance network and the output terminal thereof being connected to one of said pair of deflecting electrodes, the input and output terminals of said second deflection amplifier being connected to the output terminal of said first deflection amplifier and the other of said pair of deflecting electrodes respectively.

6. An energizing circuit for a cathode ray tube having at least a cathode electrode, a control electrode, a focusing electrode, an electron accelerating electrode and a pair of electron deflecting electrodes, which energizing circuit comprises means for maintaining said accelerating electrode at a predetermined reference voltage, a source of regulated D.C. voltage, voltage dividing resistance means cooperating with said source and having a plurality of taps at different voltage levels, connections between some of said taps and said cathode, control and focusing electrodes respectively for maintaining said last recited electrodes at negative voltages with respect to said reference voltage, and a plurality of gate circuits for signals to be applied to said deflecting electrodes, each of said gate circuits comprising a first electron discharge device having at least a cathode, an anode and a signal grid, a second electron discharge device having a cathode and an anode, a cooperating signal weighting resistance network for each of said gate circuits, an energizing connection between the anode of each of said first discharge devices and a tap on said resistance means, said last named connection including a resistance for each anode and a voltage inverting unity gain amplifier, said second discharge device and said cooperating resistance network connected in series between the anode of said first discharge device and a point of fixed potential, first and second voltage inverting deflection amplifiers, said input terminal of said first deflection amplifier being connected to each of said resistance networks and the output terminal thereof being connected to one of said pair of deflecting electrodes, and the input and output terminals of said second deflection amplifier being connected to the output terminal of said first deflection amplifier and the other of said pair of deflecting electrodes respectively.

7. An energizing circuit for a cathode ray tube according to claim 5 which further comprises centering means including a second voltage inverting amplifier and a variable resistance serially connected between the output of said first inverting amplifier and the input terminal of said first deflection amplifier.

8. An energizing circuit for a cathode ray tube according to claim 6 which further comprises centering means including a second voltage inverting amplifier and a variable resistance serially connected between the output of said first inverting amplifier and the input terminal of said first deflection amplifier.

9. An energizing circuit for a cathode ray tube having at least a cathode, a control electrode, a focusing electrode, an accelerating anode and a pair of deflection electrodes, which energizing circuit comprises a source of regulated voltage, a voltage dividing potentiometer having a plurality of taps at negative voltage levels with respect to a predetermined reference voltage, a connection between said control electrode and a first tap at a high negative voltage on said potentiometer, a connection between said cathode and a second tap at a lesser negative voltage than said first tap, a connection between said focusing electrode and a third tap at a lesser negative voltage than said second tap, a connection for maintaining said accelerating anode at said reference voltage, and means for energizing said pair of deflection electrodes which comprises a gate circuit including a first discharge device having an anode, a signal input electrode, and a cathode and a second discharge device having an anode and a cathode, the anode of said first tube being connected to a tap on said potentiometer through a resistance and a first inversion amplifier, the anode of said second tube being connected to the anode of said first tube and the cathode of said second tube being connected to ground through a signal weighting network of resistances, said circuit for energizing said deflection electrodes further comprising first and second deflection amplifiers, a connection between said weighting network and the input of said first deflection amplifier, the output of said first amplifier being connected to the input of said second deflection amplifier and the output of each of said deflection amplifiers being connected respectively to a deflecting anode of said pair, and a connection between the output of said first inverting amplifier and the input of said first deflection amplifier, which connection includes a second inversion amplifier.

10. Signal display apparatus comprising a signal source, a cathode ray tube having means for propagating a beam of electrons to impinge on a display screen and means for deflecting the beam in one direction transverse to the direction of propagation, and a signal gating and weighting circuit comprising an electron discharge device having an anode and a cathode, an output impedance in the cathode circuit of said device, a source of substantially constant potential for energizing the anode of said device, means controlled by said signal source for attenuating the constant potential to a value below that required for conduction by said device when the signal source delivers a signal less than a predetermined value and for applying the constant potential to the anode when the signal source delivers a signal greater than a predetermined value, and means for applying the potential developed across the output impedance to the deflecting means of the cathode ray tube, whereby the magnitude of the deflection of the electron beam is independent of the absolute value of the signal greater than the predetermined value and is dependent on the potential developed across the output impedance.

11. Signal display apparatus comprising a signal source, a cathode ray tube having means for propagating a beam of electrons to impinge on a display screen and means for deflecting the beam in one direction transverse to the direction of propagation, and a signal gating and weighting circuit comprising an electron discharge device having an anode and a cathode, a source of potential for energizing the anode, an output impedance in the cathode circuit of the device, means controlled by the signal source for energizing the anode from the potential source at a substantially constant value sufficient to cause the device to conduct when the signal source delivers a signal greater than a predetermined value and for attenuating the potential from said source to a value below that required for conduction by the device when the signal delivered by the signal source is less than the predetermined value, and means for applying the potential developed across the output impedance to the deflecting means of the cathode ray tube, whereby the magnitude of the deflection of the electron beam is independent of the absolute value of the signal greater than the predetermined value and is dependent on the potential developed across the output impedance.

12. Signal display apparatus comprising a signal source, a cathode ray tube having means for propagating a beam of electrons to impinge on a display screen and means for deflecting the beam in one direction transverse to the direction of propagation, and a signal gating and weighting circuit comprising a first electron discharge device having an anode and a cathode, an output resistance in the cathode circuit of the device, a second electron discharge device having an anode, a control electrode and a cathode, an anode energizing circuit for the device including a source of substantially constant potential and an anode resistance connected between the potential source and the anode of the device, means for operatively connecting the signal source to the control electrode of the second device and for rendering the second device conductive to attenuate the potential at the anode of the first device to a value below that required for conduction by the first device when the signal source delivers a signal less than a predetermined value, the connecting means also rendering the second device non-conductive when the signal source delivers a signal greater than a predetermined value so that the potential at the anode of the first device has a value sufficient for conduction of the first device, and means for applying the potential developed across the output resistance to the deflecting means of the cathode ray tube, whereby the magnitude of the deflection of the electron beam is independent of the absolute value of the signal greater than the predetermined value and is dependent on the potential developed across the output resistance.

13. Signal display apparatus comprising a cathode ray tube having means for propagating a beam of electrons to impinge on a display screen and means for deflecting the beam in one direction transverse to the direction of propagation, a plurality of signal sources each provided with a signal gating and weighting circuit which comprises an electron discharge device having an anode and a cathode, an output resistance in the cathode circuit of the device and having a value proportional to the magnitude of the beam deflection to be produced in response the signal delivered by the associated signal source, a source of substantially constant potential for energizing the anodes of the discharge devices of the several circuits, means controlled by the signal source associated with each discharge device for attenuating the constant potential to a value below that required for conduction of that device when the associated signal source delivers a signal less than a predetermined value and for applying the constant potential to the anode of that discharge device when the associated signal source delivers a signal greater than the predetermined value, means for summing the potentials developed across the several output resistances, and means for applying the summed potentials to the deflecting means of the cathode ray tube, whereby the magnitude of the deflection of the electron beam is independent of the absolute values of the signals greater than the predetermined values and is dependent on the summed potentials developed across the several output resistances.

14. Signal display apparatus comprising a cathode ray tube having means for propagating a beam of electrons to impinge on a display screen and means for deflecting the beam in one direction transverse to the direction of propagation, a plurality of signal sources each provided with a signal gating and weighting circuit which comprises a first electron discharge device having an anode, a control electrode and a cathode and a second electron discharge device having an anode and a cathode, anode energizing circuits for the first and second devices of the several gating circuits including a common source of substantially constant potential and a resistance connecting the anodes of the discharge devices of each weighting circuit to the common source, an output resistance in the cathode circuit of the second device and having a value proportional to the magnitude of the beam deflection to be produced in response to the signal delivered by the associated signal source, means for operatively connecting each signal source to the first discharge device control electrode of the associated weighting circuit and for rendering conductive the first device of that weighting circuit to attenuate the potential a the anode of the second device to a value below that required for conduction by the second device when the associated signal source delivers a signal less than a predetermined value, the connecting means also rendering the first device non-conductive when the associated signal source delivers a signal greater than the predetermined value so that the potential at the anode of the second device has a value sufficient for conduction by the first device, means for summing the potentials developed across the several output resistances, and means for applying the summed potentials to the deflecting means of the cathode ray tube, whereby the magnitude of the deflection of the electron beam is independent of the absolute values of the signals greater than the predetermined values and is dependent on the summed potentials developed across the several output resistances.

15. An energizing circuit for a cathode ray tube having at least a cathode electrode, a control electrode, a focusing electrode, an electron accelerating electrode and a pair of electron deflecting electrodes, which energizing circuit comprises a source of voltage, means for maintaining one of said electrodes other than said deflecting electrodes at a predetermined reference voltage, a source of voltage, voltage dividing means connected to said source, controlling means connected to a tap on said voltage dividing means which is at said predetermined reference voltage for detecting variations of the voltage of said source and for maintaining variations of the voltages derivable from said dividing means proportional to variations of the voltage of said source and connections between said voltage dividing means and all of said electrodes other than said one electrode for energizing said other electrodes at appropriate voltages negative and positive with respect to said reference voltage.

References Cited in the file of this patent

UNITED STATES PATENTS

| 2,123,011 | Keyston | July 5, 1938 |
| 2,313,967 | Read | Mar. 16, 1943 |
| 2,353,018 | Duke | July 4, 1944 |
| 2,356,140 | Applegarth | Aug. 22, 1944 |
| 2,441,732 | Torsh | May 18, 1948 |
| 2,454,810 | Labin | Nov. 30, 1948 |
| 2,465,406 | Taylor | Mar. 29, 1949 |
| 2,466,065 | Weichardt | Apr. 5, 1949 |
| 2,622,193 | Clayden | Dec. 15, 1952 |

UNITED STATES PATENT OFFICE

CERTIFICATE OF CORRECTION

Patent No. 2,879,445 March 24, 1959

Lloyd L. Gordon

It is hereby certified that error appears in the printed specification of the above numbered patent requiring correction and that the said Letters Patent should read as corrected below.

Column 9, line 20, for the claim reference numeral "6" read -- 4 --.

Signed and sealed this 30th day of June 1959.

(SEAL)
Attest:

KARL H. AXLINE
Attesting Officer

ROBERT C. WATSON
Commissioner of Patents